US008856039B1

(12) United States Patent
Talreja et al.

(10) Patent No.: US 8,856,039 B1
(45) Date of Patent: Oct. 7, 2014

(54) INTEGRATION OF SECONDARY CONTENT INTO A CATALOG SYSTEM

(75) Inventors: Kamlesh T. Talreja, Issaquah, WA (US);
Mark Chien, Bellevue, WA (US);
Ryuichi Hirano, Ronton, WA (US);
Sean M. Scott, Sammamish, WA (US);
Qiang Zhao, Mercer Island, WA (US)

(73) Assignee: Amazon Technologies, Inc., Reno, NV (US)

( * ) Notice: Subject to any disclaimer, the term of this patent is extended or adjusted under 35 U.S.C. 154(b) by 524 days.

(21) Appl. No.: 13/012,597

(22) Filed: Jan. 24, 2011

(51) Int. Cl.
*G06F 17/30* (2006.01)

(52) U.S. Cl.
USPC ............................................ 705/27.1

(58) Field of Classification Search
USPC .......................................... 705/27.1
See application file for complete search history.

(56) References Cited

U.S. PATENT DOCUMENTS

| | | | | |
|---|---|---|---|---|
| 7,373,313 B1 * | 5/2008 | Kahle et al. | .................. | 705/26.3 |
| 7,617,121 B1 * | 11/2009 | DeMayo et al. | ........... | 705/14.26 |
| 7,778,926 B1 * | 8/2010 | Grinchenko et al. | ........... | 705/50 |
| 7,975,020 B1 * | 7/2011 | Green et al. | .................. | 709/217 |
| 8,244,590 B2 * | 8/2012 | Rothman | ..................... | 705/26.1 |
| 8,356,097 B2 * | 1/2013 | Cancel et al. | ................. | 709/224 |
| 8,533,141 B2 * | 9/2013 | Doig et al. | ...................... | 706/47 |

OTHER PUBLICATIONS

Powell, Cathy, "The origin and History of Wikipedia, What in the world is Wikipedia?", Yahoo Contributor Network, dated May 25, 2006.*
Press release titled "New Tusonic features allow music services to leverage Wikipedia content," dated Oct. 22, 2005 (2 pages).

* cited by examiner

*Primary Examiner* — Mark Fadok
(74) *Attorney, Agent, or Firm* — Knobbe, Martens, Olson & Bear, LLP

(57) ABSTRACT

A system is disclosed that integrates secondary content, such as articles retrieved from a collaborative encyclopedia or other content site, into an electronic catalog system or site that hosts an interactive electronic catalog. In some embodiments, the system operates by retrieving secondary content articles from an external system or site, and by supplementing these articles with interactive display elements for accessing related catalog content and/or functions. For example, if an article mentions a particular catalog item or group of catalog items, it may be supplemented with a selectable display element for viewing catalog content associated with the referenced item or item group. The supplemented articles are made available to users via pages of the electronic catalog system or site.

32 Claims, 7 Drawing Sheets

*400*

Catalog.com
Integrated Collaborative Encyclopedia

| Article |

The Shining (Novel)   *402*
From Colloborative Encyclpedia

*307*  *306*

The Shining [A] is a 1977 horror novel by American author Stephen King. The title was inspired by the John Lennon song "Instant Karma!", which contained the line "We all shine on...". It was King's third published novel, and first hardback bestseller, and the success of the book firmly established King as a preeminent author in the horror genre....

*404*

The Shining

[Picture Here]

Author: Stephen King
Cover artist: Dave Christensen
Country: United States
Language: English
Genre(s): Gothic, Horror
Publisher: Doubleday
ISBN: 0743424425

*406*

Contents
1. Plot Summary
2. Characters
   2.1 Danny Torrance
   2.2 Jack Torrance
   2.3 Wendy Torrance
   2.4 Dick Hallorann
   2.5 Horace Derwent
   2.6 Stuart Ullman
3. Editions
4. Background
5. Links to King's other works
6. Possible sequel
7. Footnotes
8. External links

Plot summary

Jack Torrance is a temperamental alcoholic and aspiring writer. He is trying to rebuild his life after previously breaking his son Danny's arm in a drunken rage and assaulting a pupil at a Vermont prep school where he was a teacher. After losing his teaching position and giving up drinking, Jack accepts a job as a winter caretaker at the large, isolated Overlook Hotel in Colorado to rebuild his life with his family and write a new play. Jack, his wife Wendy, and the clairvoyant Danny move into the Overlook

*Fig. 4.*

Catalog.com

Department
Any Department

Books
Literature &Fiction
Science Fiction & Fantasy
Mystery & Thrillers
Buisness & Investing

Format
Any Format

Any Format
Audibooks
HTML
Kindle Books

Search: [Steven King] ─ 502

Books: Stephen King

Results

1. [The Shining]   The Shining   by Stephen King ─ 504
                  Buy in Hardcover  $20.00
                  Buy in Paperback  $12.00

2. [Picture Here]   Stephen King - Catalog Linked Collaborative Encyclopedia Page ─ 506

3. [IT]   IT   by Stephen King ─ 504
         Buy in Hardcover  $20.00
         Buy in Paperback  $12.00

INTEGRATION OF SECONDARY CONTENT INTO A CATALOG SYSTEM

BACKGROUND

Retailers and merchants involved in electronic commerce continually strive to make it easier for customers to research products and services and to receive information that may assist in purchasing decisions. One way to improve a customer's experience includes providing comprehensive information on products or services in a manner with which the customer is familiar. While there are many sources that provide such comprehensive information, many are not directly integrated with the catalog systems of the retailer. Various information rich articles, such as articles contained within collaborative encyclopedias, are accessible and familiar to both the customer and the retailer, but exist separately from the catalog system. While these articles are useful for customers to gain information on a wide variety of products and services, customers typically must access these articles independently, outside of the retailer's catalog system.

BRIEF DESCRIPTION OF THE DRAWINGS

Specific embodiments of the invention will now be described with reference to the following drawings:

FIG. 4 illustrates another example of a supplemented collaborative encyclopedia article as served on a page of the electronic catalog site. In this example, the article is about a particular book title.

FIG. 5 illustrates another user interface generated by the electronic catalog system, and more specifically, illustrates a search results page that lists matching book titles and a matching (supplemented) collaborative encyclopedia article.

DETAILED DESCRIPTION OF SPECIFIC EMBODIMENTS

Figure 1:
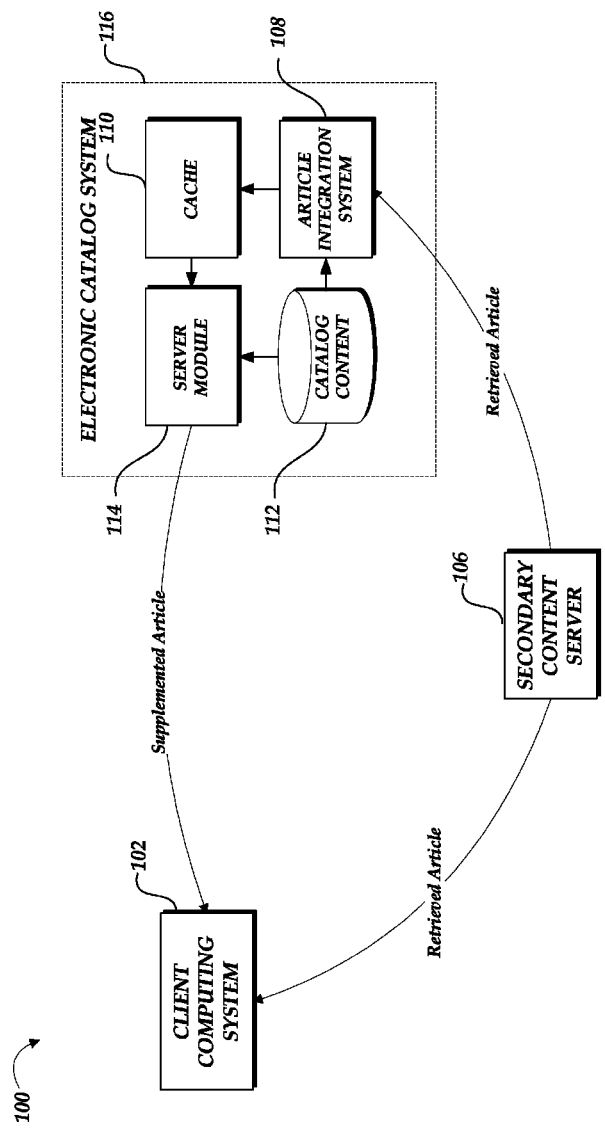
FIG. 1 is a block diagram depicting an electronic catalog system or site that retrieves articles from a secondary content server, supplements the articles with catalog-related content and functionality, and provides user access to the supplemented articles.

A system is disclosed that integrates secondary content, such as articles retrieved from a content site, into an electronic catalog system or site that hosts an interactive electronic catalog. In some embodiments, the system operates by retrieving secondary content articles from an external system or site, and by supplementing these articles with interactive display elements for accessing related catalog content and/or functions. The supplemented articles are then made available to users via pages of the electronic catalog system or site.

In some embodiments, the secondary content contains information associated with particular catalog items or collections of catalog items represented in the electronic catalog. For example, the secondary content may include or consist of articles, such as collaborative encyclopedia articles, that reference particular book titles, movie titles, musical works, electronics products, and/or other types of products represented in the electronic catalog. These references may be transformed into links or other display elements that are selectable by users to access related catalog content or functions.

As one example, if an article references a particular product that is included in the catalog, the reference to the product may be converted into a link that is selectable (e.g., via a mouse-over operation) to cause an associated popover to be displayed on the page. The popover may, for example, display related catalog content (e.g., price, average customer rating, product image, etc.), or may display controls for performing various associated actions (e.g., rating the product, accessing the product's detail page in the catalog, or adding the product to a shopping cart, wish list or rental queue). The catalog content associated with the referenced product may alternatively be displayed elsewhere on the page, such as in a sidebar area adjacent to the article text.

The secondary content may also be integrated into the electronic catalog system by supplementing catalog pages with links to related articles. For example, an item detail page on the electronic catalog system for a particular book title may be supplemented with a link to a collaborative encyclopedia article about the book or its author. As another example, when a user of the electronic catalog system performs a catalog search, the search results page may, in additional to listing matching catalog items, display links to one or more collaborative encyclopedia articles that are related to the user's search query.

As will be recognized, various other types of secondary content can be used in addition to, or in place of, the collaborative encyclopedia articles described herein. For example, the secondary content may include journal entries retrieved from an electronic journal site, news articles retrieved from a news site, or product reviews authored by customers or professional reviewers. Illustratively, an article written on an electronic journal site, such as a "blog," may correspond to an item or items within the electronic catalog system, such as items related to a media program. This article may be integrated into the electronic catalog system such that references to the media program within the article are supplemented with links corresponding to items within the electronic catalog. As will be appreciated by one of ordinary skill in the art, the types of secondary content are not limited to those types described above, but may include any secondary content which corresponds with an item or items within an electronic catalog.

In one embodiment, the system operates by searching the retrieved articles (or other units of secondary content) for keywords and keyword phases that correspond to particular catalog items. To simplify the description, the term "keyword" is used hereinafter to refer both to keywords (individual terms) and to keyword phrases (ordered sequences of two or more terms). The keyword searching may be conducted according to a set of rules, such as rules based on the manner in which the articles are categorized in the collaborative encyclopedia system or other secondary content source. For example, an article categorized in the "books" category may be searched according to rules for "book"

articles, while an article in the "musical artists" category may be searched according to rules for musical artist articles. In some embodiments, if the categorization of a collaborative encyclopedia article is unknown or unrecognized, a generic set of searching rules may be used. In other embodiments, a generic set of searching rules may be used for all retrieved articles.

In some embodiments, the electronic catalog system may implement retrieval rules for automatically selecting articles to retrieve from the secondary content system. These retrieval rules may specify, for instance, retrieval of articles of a certain category (e.g., "books"), articles over a certain length, articles of a certain volatility (e.g., by measure of the number of changes to the article over a period of time), or any number of other criteria. As the articles are retrieved and supplemented, they may be stored in a cache of the electronic catalog system, and the cache may be used to service user requests for particular articles. The cached copy of a collaborative encyclopedia article may periodically be replaced with a newly retrieved/supplemented copy at a rate that depends, for example, on the rate of change of the article or the volatility of the article's category.

In some embodiments, the secondary content may be further modified to be associated with other supplemented secondary content. For example, in the case of articles retrieved from a collaborative encyclopedia system, links pointing to other articles in the collaborative encyclopedia system may, where appropriate, be modified to point to their supplemented versions hosted by the electronic catalog system.

By way of overview, FIG. 1 is a block diagram illustrative of the integration of articles into an electronic catalog system 116. As illustrated in FIG. 1, the electronic catalog system or site 116 includes an article integration system 108 that retrieves articles from a secondary content server or site 106, and makes supplemented versions of these articles available to users via their client computing systems 102 (one shown). The electronic catalog system 116, may, for example, host a web site or other interactive system that provides functionality for users to browse and make purchases from an electronic catalog. The secondary content server 106 may, for example, host a web site or other interactive system for accessing articles about various topics. The client computing system 102 may, for example, be a PC, mobile phone, tablet computer, or other type of computing device that may be used to access the electronic catalog system. The illustrated communications may occur over a Wide Area Network (WAN) such as the Internet, and/or over another type of network. Though, for illustrative purposes, communication is shown between each of the three components, communication between the secondary content server and the client computing system is not a necessary aspect of the current disclosure.

As shown in FIG. 1, the article integration system 108 retrieves an article from the secondary content server 106. The article integration system 108 further receives catalog content 112. After supplementing the retrieved article (a process which will be described in more detail with respect to FIG. 6, below), the supplemented article is stored in a cache 110. A server module 114 within the electronic catalog system 116 makes both the catalog content 112 and the contents of the cache 110 available to client computing systems 112.

Figure 2:
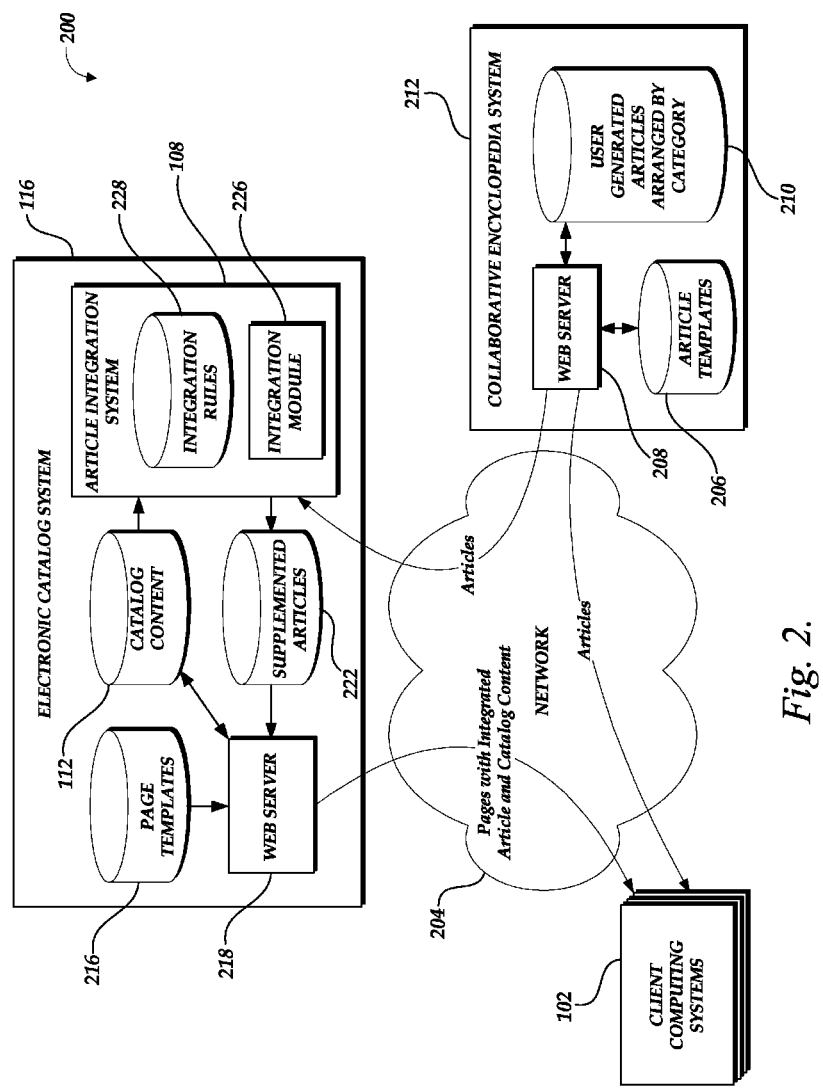
FIG. 2 illustrates an embodiment in which the articles are collaborative encyclopedia articles retrieved from a collaborative encyclopedia system or site.

FIG. 2 illustrates one embodiment of the system of FIG. 1, and more specifically, an embodiment in which the electronic catalog system 116 retrieves articles from a collaborative encyclopedia system or site 212. The collaborative encyclopedia system 212 includes a web server 208. This web server 208 provides user access to user generated articles arranged by category 210, and also provides functionality for users to collaborative generate and update articles. In some embodiments, the user generated articles 210 are may be created according to article templates 206, some of which correspond to particular article categories (e.g., books, movies, authors, etc.). In other embodiments, only some of the user generated articles 210 are created according to article templates 206. In still more embodiments, none of the user generated articles are created according to the article templates 206. Typically, the electronic catalog system and the collaborative encyclopedia system are operated by different respective business entities.

As shown in FIG. 2, the article integration system 108 retrieves articles from the collaborative encyclopedia system 212. As will be appreciated by one of ordinary skill in the art, the retrieval of articles by the article integration system 108 may be accomplished by a variety of mechanisms. Illustratively, articles may be retrieved by accessing a web server 208 within the collaborative encyclopedia system 212. In some embodiments, the article integration system 108 retrieves articles using a crawling program to crawl the collaborative encyclopedia system 212 and locate articles to retrieve. In other embodiments, the article integration system 108 retrieves articles based on a pre-generated list of locations within the collaborative encyclopedia system 212 (for example, a list of URL's). Such a pre-generated list may be created automatically via a crawling program, manually, or by a combination thereof. In still more embodiments, the article integration system 108 may retrieve articles through cooperation with the provider of the collaborative encyclopedia system 212, whereby articles, portions of articles, or article locations are sent from the collaborative encyclopedia system 212 to the electronic catalog system 116.

The article integration system 108 includes an integration module 226 and integration rules 228. The integration module creates supplemented articles 222 according to integration rules 228 and catalog content 112 (a process which will be described in more detail with respect to FIG. 6, below). A web server 218 makes both supplemented articles 222 and catalog content 112 available to client computing systems 102 via a network 204. Both supplemented articles 222 and catalog content 112 may be formatted according to page templates 216. In some embodiments, the page templates 216 may be similar to or the same as article templates 206. However, the page templates 216 are not limited by the article templates 206, and might not be related to article templates 206. In some embodiments, article templates 206 may not be accessible to the electronic catalog system 116. The articles may be retrieved and republished by the electronic catalog system in accordance with a content licensing or republication policy of the collaborative encyclopedia site.

The electronic catalog system 116 shown in FIGS. 1 and 2, including the article integration system 108, may be implemented as a computer system that comprises one or more general purpose and/or special purpose computers or computer processor. For example, these systems 116, 108 may be implemented via one or more computing devices programmed with executable instructions stored in non-transitory computer storage. The electronic catalog system 116 may be in the form of a web site system that hosts a web site, an interactive television system, or any other type of computer-based interactive system that provides interactive user access to the catalog content and secondary content. Typically, the electronic catalog system provides functionality for users to purchase items represented in the electronic catalog from one or more sellers; however, this need not be the case.

Figure 3:
FIG. 3 illustrates a user interface generated by the electronic catalog system, and more particularly, illustrates a page containing a collaborative encyclopedia article that has been supplemented with interactive display elements for accessing related catalog content and functions. In this example, the article is about a particular author.

FIG. 3 is an illustrative user interface 300 generated by the electronic catalog system 116, as displayed via a browser application operating upon a computing device 102. (In other embodiments, the user interface screens or pages may be displayed by a different type of client application, such as an iPhone™ application or other non-browser mobile application.) In this example, the user interface 300 is a page that includes an article 302 falling in the "authors" category of the collaborative encyclopedia 212. The article 302 mentions specific book titles that are represented in the electronic catalog 116, and these references have been identified by searching the article for specific book-related keywords. The textual references to specific book titles have been converted into links, such as link 307, which are selectable to both view the collaborative encyclopedia article associated with the specific book title, as well as corresponding catalog content. The links that have been created in this manner are tagged with a small icon 306 to enable the user to visually distinguish these links 307 from the article's native links. In this embodiment, when the user selects a link such as link 307, for instance by the click of a mouse, the (supplemented) collaborative encyclopedia article which corresponds to the specific book title is displayed. Additionally, when the user hovers the mouse cursor over the link 307 or its icon 306, a popover 308 is displayed with catalog content (e.g., price, product image, average customer rating, etc.) about the book title. The popover 308 may also include controls for performing various actions associated with the book title, such as rating the book title, navigating to the book title's product detail page, or adding the book title to a shopping cart or wish list of the electronic catalog system 116. The popover 308 may disappear on the page when the user moves the mouse cursor away from the link, and other catalog-item-specific popovers may appear as the mouse cursor is positioned over other links. Methods for incorporating popovers into web pages via JavaScript and other languages are well known in the art. Although popovers are used in the illustrated embodiments, they are not essential to the invention. For example, when the user hovers the mouse pointer over, or otherwise selects, an added link associated with a keyword, the associated catalog content may be displayed in a designated/reserved area on the page, such as a sidebar area to the right or left of the article. Though the current illustration discusses a link 307 which, when clicked, display an associated supplemented collaborative encyclopedia page and which, when hovered over, display a popover 308, one of ordinary skill in the art will recognize that these functions (e.g., redirecting to a supplemented article or displaying a popover) could occur in response to any type of user input, or in some embodiments could occur without user input.

As illustrated by the product images and text 310 on the left of the page, content associated with the referenced catalog items may additionally or alternatively be displayed separately from the article text 302, such as in a sidebar area. Although the illustrated popover 308 in this example corresponds to a single catalog item, popovers may also be displayed for particular item collections, item brands, authors, musical artists, actors, manufactures, and other catalog-related entities related to the article.

FIG. 4 is an illustrative user interface 400 generated by an electronic catalog system 116 as displayed via a browser application operating upon a computing device 102. (Similarly to above, in other embodiments, the user interface screens or pages may be displayed by a different type of client application, or other non-browser mobile application.) In this example, the user interface 400 is a page that includes an article 402 falling in the "books" category of the collaborative encyclopedia 212. The article 402 is directed towards a specific book title that is represented in the electronic catalog 116. The book is described, in part, by an International Standard Book Number (ISBN) 406, which identifies the book on both the collaborative encyclopedia system 212 and the electronic catalog system 116. This ISBN may be used by the article integration system 108 to search for related catalog content contained within catalog content 112 (a process which will be described in more detail with respect to FIG. 7, below). In some cases, an article about a book might not contain an ISBN. Where an ISBN is not available, the article integration system 108 may identify that an article 402 corresponds to a book within the catalog content 112 by various other mechanisms, some of which will be discussed in more detail with respect to FIG. 6, below.

In addition, the article 402 has been supplemented with a number of links corresponding to catalog items represented within the catalog content 112. Similarly to article 302 of FIG. 3, the article 402 contains a link 307 and corresponding icon 306 which are selectable to view corresponding catalog content. Additionally, the article 402 contains a link 408, which is selectable to view information regarding items in the catalog content 112 which corresponds to the topic of the article. As previously described, links 306, 307, and 408 may, for example, display catalog content related to the item (e.g., price, average customer rating, product image, etc.), or may display controls for performing various associated actions (e.g., rating the product, accessing the product's detail page in the catalog, or adding the product to a shopping cart, wish list or rental queue). As will be appreciated by one of ordinary skill in the art, the functionality of the added links within a supplemented secondary content page is not limited to those examples described above, but may include any functionality corresponding to a catalog item or group of catalog items.

Further, the article 402 contains links to other articles 404. Within the original collaborative encyclopedia article, these links to other articles 404 would have been pointed to articles contained within the collaborative encyclopedia system 212. However, in the present example, the article integration system 108 has modified the links to other articles 404 such that they point to supplemented articles 222 within the electronic catalog system 116.

FIG. 5 is an illustrative user interface 500 (search results page) generated by an electronic catalog system 116 showing the results of a search on the electronic catalog system 116 for search terms 502, "Stephen King." The search results page lists matching catalog items 504 (namely books by author Stephen King), and also includes a link 506 to a supplemented collaborative encyclopedia article corresponding to the user's search query. This article link 506 may point, for instance, to a supplemented collaborative encyclopedia article 300 shown in FIG. 3.

Figure 6:
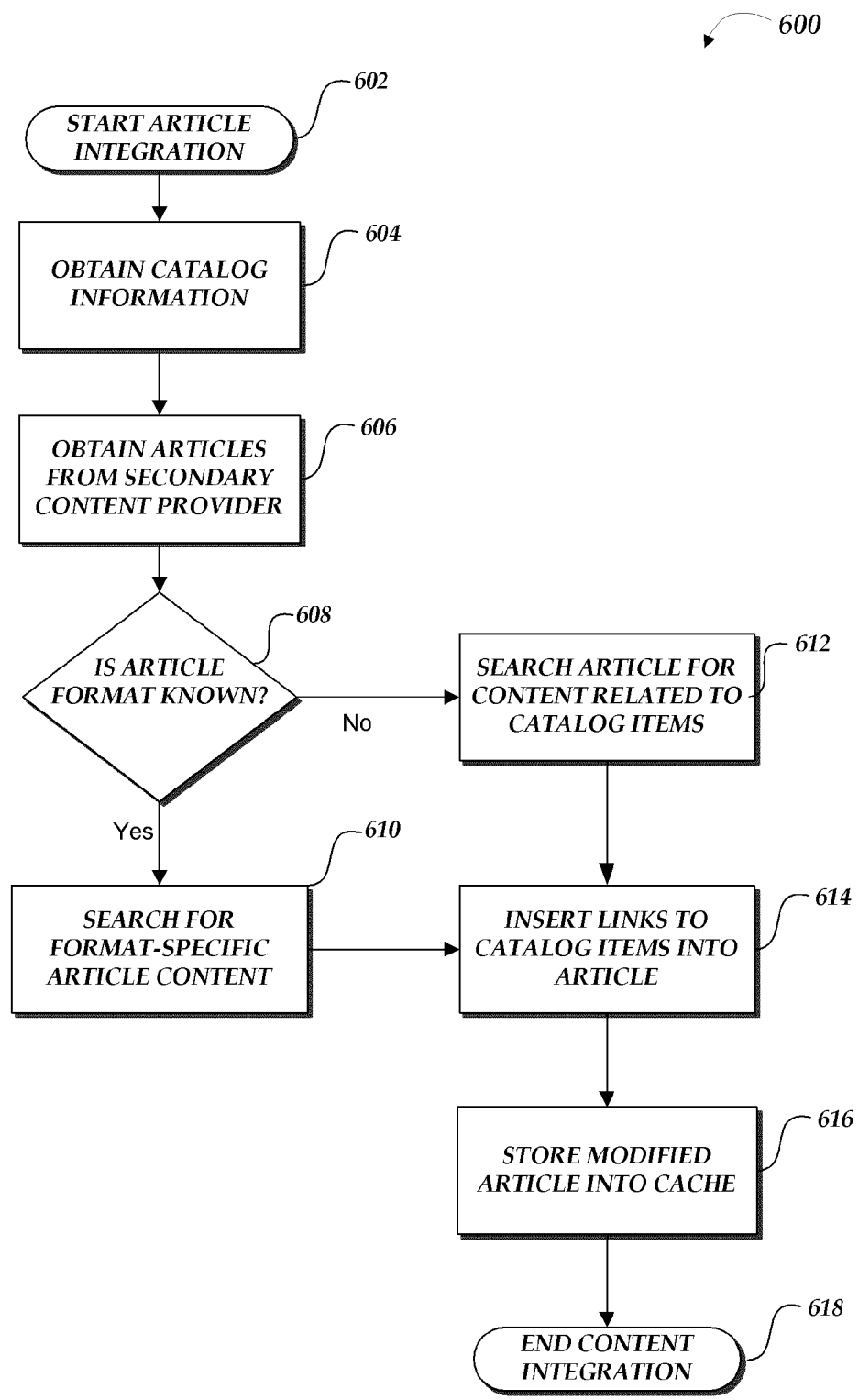
FIG. 6 is a flow diagram of an illustrative method implemented by the article integration system to supplement articles with catalog-related content and functionality.

FIG. 6 is a flow diagram 600 of an illustrative method implemented by the article integration system 108 to supplement articles with information from the electronic catalog system 116. As illustrated in FIG. 6, the method begins at block 604, where the article integration system 108 obtains catalog information from the catalog content 112. The method then proceeds to obtain an article from a secondary content server 106 at block 606. Though the FIG. 6 depicts block 604 prior to block 606, one of ordinary skill in the art will appreciate that block 604 may occur at any point before links are inserted into the article at blocks 614. In some embodiments, as will be described below, catalog content 112 is not retrieved until after the format of the article has been identified. In some embodiments, block 614 may entail retrieving only information from the catalog content 112 which corresponds to a single catalog item. Additionally, though the method is described here in reference to a single article, one of ordinary skill in the art will appreciate that multiple articles may be integrated simultaneously.

After an article is obtained at block 606, the format of the article is determined at block 608. This determination may be made, for instance, according to a set of integration rules 228. If the article format is known, the article may be analyzed according to format-specific rules contained within the integration rules 228. An example of this analysis is discussed below with reference to FIG. 7.

In some embodiments, format-specific rules may utilize components present in the original article. For example, articles within a secondary content system may be interlinked such that textual references within a first article which correspond to a topic of a second article are selectable to view the content of the second article. Illustratively, an article integration system, such as the article integration system 108 of FIG. 2, may retrieve a number of articles from a collaborative encyclopedia system 212 of FIG. 2. Each article may correspond to a particular topic. The article integration system 108 may, for each article, first identify the item or items within the catalog content 112 of FIG. 2 which correspond to the topic of the particular article. One illustrative embodiment of a method of identification will be described below with respect to FIG. 7. When an article is identified as corresponding to a particular catalog item or group of items, the article may be supplemented with a link or links corresponding to the catalog item or items, such as link 408 of FIG. 4.

Further, once each article has been recorded as corresponding to an item or group of items, the article integration system 108 may inspect each retrieved article for keywords which are directed towards other articles. Where a keyword is directed towards an article which, as previously recorded, corresponds to a particular catalog item, that keyword may also be recorded as corresponding to the particular catalog item. For example, the article 402 of FIG. 4 may be identified as corresponding to the book "The Shining." The article 302 of FIG. 3 may include keyword 307 ("The Shining") which is directed towards article 402. Because article 402 has been previously identified as corresponding to the book "The Shining," keyword 307 of FIG. 3 would also be identified as corresponding to the book "The Shining"

If the article format is not known, the article may be searched according to a set of generic rules as shown at block 612. In some embodiments, these generic rules may apply a generic set of search methods to identify an item within the electronic catalog system 116 to which the article corresponds. Thereafter, any keywords which exist in the specific article or in other retrieved articles and which are directed to the specific article would be identified as corresponding to the identified item.

These generic search methods may be accomplished by a variety of mechanisms Illustratively, a first article may be identified as corresponding to a particular item within the item catalog 112 of FIG. 1 based on keywords in other articles which are directed towards the first article. For example, the article integration system 108 of FIG. 1 may attempt to classify the article 302, entitled "Stephen King." The article integration system 108 may have previously recorded the article 402, entitled "The Shining (Novel)" as an article corresponding to a book. Further, the article 402 may have previously been classified as containing a keyword 404 ("Stephen King") which is directed towards article 302. Because the article 302 is referred to by another article 402, which itself corresponds to the book "The Shining," the article integration system 108 may attempt to identify the topic of article 302 as in some way related to the book "The Shining" In some embodiments, this identification may be accomplished by searching the item catalog 112 based on the keywords in the referring article. In this example, the article integration system 108 may search the item catalog 112 for items corresponding to keyword 404 ("Stephen King") which are in some way related to the book "The Shining" Based on the results of that search, the article 302 may be recorded as corresponding to the author "Stephen King."

In some aspects, other mechanisms may be used to identify catalog items which correspond to a particular retrieved article. For example, manual classification may be utilized either for initial identification or for verification of identifications made by other mechanisms. In some embodiments, manual classification may entail hiring persons to identify articles. In other embodiments, the article may be supplemented in such a way that users viewing the supplemented article via the electronic catalog system 116 may identify corresponding items within the catalog content 112. Illustratively, a supplemented article may contain coding which allows a user viewing an article to select an item within the catalog content 112 corresponding to the article.

In still more aspects, articles may be identified as corresponding to items within the catalog content 112 by methods of electronically searching the content of the article. For example, the title of the article may be used to identify corresponding catalog content. In some embodiments, the other content of an article may be used alone or in conjunction with the title to identify corresponding catalog content. Illustratively, content of the article 302 of FIG. 3 (which is directed towards an author) may contain information, such as birthdates, names of family members, lists of works, or other information, which may be used to identify the article as corresponding to a particular catalog item or group of catalog items within the catalog content 112. In some embodiments, the style of the content, such as capitalization of text, may be used to identify potentially relevant information. Such content analysis may allow an article integration system 116 to identify corresponding catalog items even when keywords within the article are not directed towards other collaborative encyclopedia articles. As will be appreciated by one of ordinary skill in the art, a wide variety of processes may be used to identify an item or items within an item catalog which correspond to a particular article.

In some embodiments, other methods may be utilized to identify keywords within an article related to catalog items. For instance, rules may be defined which allow the searching of an article for keywords which correspond to items within the catalog content 112. In some embodiments, such searching may utilize a previously recorded association of the article. In this aspect, a specific subset of the catalog content 112, as defined by the previously recorded association of the article, may be searched for items which correspond to keywords in the article. For example, format specific rules may specify that once an article has been identified as corresponding to a book, the content of the article is searched for any keywords which correspond to known titles of books within the catalog content 112. In this manner, content within an article which corresponds to a catalog item may be identified, even if that content is not linked to a collaborative encyclopedia article which corresponds to the item. Such a search may be expanded, for instance, to include known authors whose name corresponds to keywords within the article, or to include any set or subset of catalog content 112. As described above, rules may further define such searches by the style of the content containing the keyword. For example, in some aspects, only capitalized keywords may be the basis for catalog searches.

In addition, a number of techniques similar to those described above may identify keywords in an article which correspond to items within an item catalog, such as catalog content 112 of FIG. 1. For example, an article might be manually searched for any keywords which correspond to items within the catalog content 112. Further, in some aspects, generic rules may specify that each item of text or content within an article should be searched against the catalog content 112 in order to identify potentially corresponding items. As will be appreciated by one of ordinary skill in the art, a wide variety of processes may be used to identify keywords within an article which correspond to items within an item catalog.

Though the method 600 depicts a determination of the article format at 608, if integration rules 228 specify that a set of generic rules is to be used for all articles regardless of format, then blocks 608 and 610 would be unnecessary, and the method would proceed to block 612.

At block 614, the method proceeds to insert links to the catalog items into the article, creating a supplemented article. These links, for instance, may be similar to links 310, displaying information corresponding to catalog content concurrently with the article. Additionally, the links inserted by block 614 may be similar to link 306, which are responsive to some methods of selection by displaying a popover containing catalog information. The link coding may, in some embodiments, include JavaScript or other coding for displaying a popover in response to a mouse-over or other user-selection event. In some cases, the links may be modified versions of native links in the original article, such as those shown at link 404, in which case the link is redirected to point to another supplemented article. In some embodiments, some links may be omitted from the supplementation process, such that the resultant article conforms to an expected result based, for instance, on the total number of desired links, relevance of links to the current article, or frequency of links within a certain area of the article.

In some embodiments, links or other content that are inserted into the article may be personalized based on user information, such as user preferences or the user's purchase history. For instance, a user who has historically purchased a certain format of book may be presented foremost with the same format of items. Further, a user may specify that only certain types of items should be shown, or that certain types of items are not preferred.

Block 616 describes the step of storing the modified article into cache 110. This cache stores the supplemented articles, and is used to service requests from client computing systems 102 for specific articles.

Figure 7:
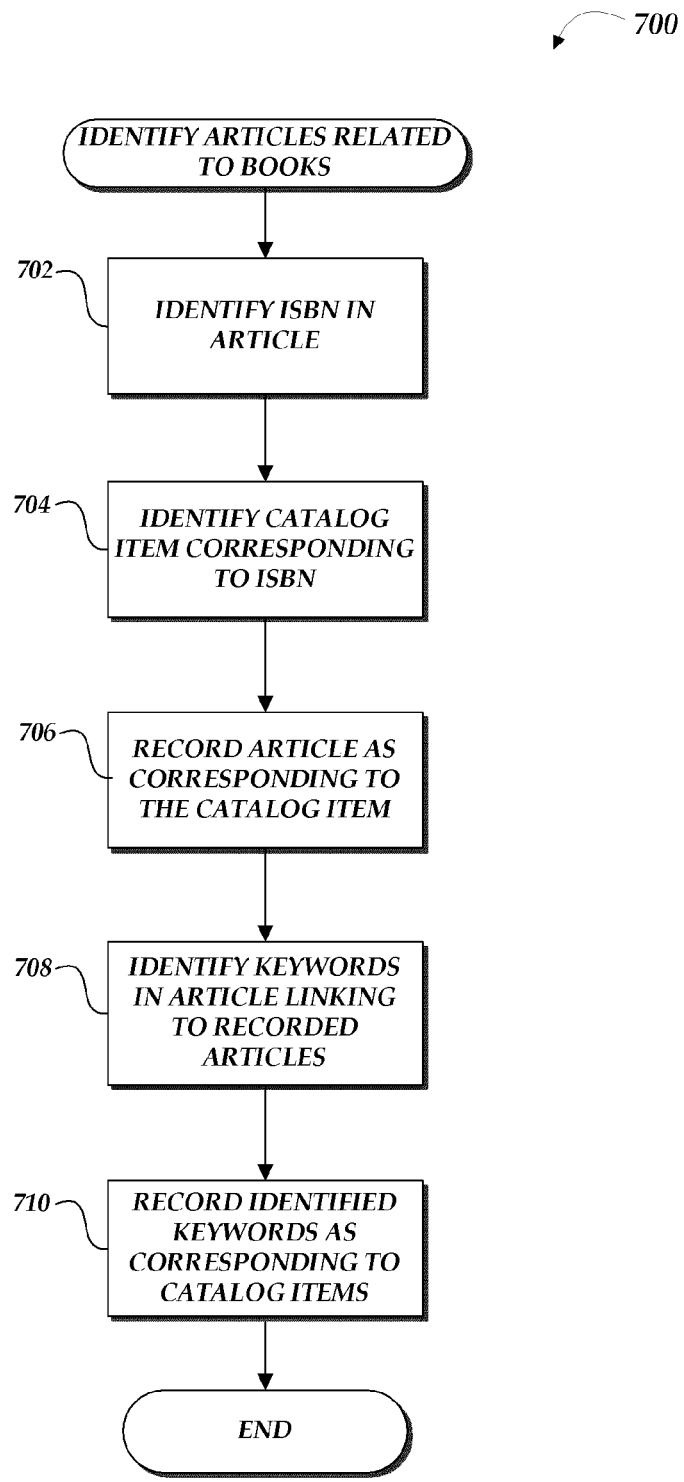
FIG. 7 is a flow diagram of an illustrative method implemented by the article integration system to identify a book and related electronic catalog content associated with keywords within the article.

FIG. 7 is a flow diagram 700 of an illustrative method implemented by the article integration system 108 to identify a book associated with an article based on an ISBN. Flow diagram 700 can correspond to an implementation of block 610 and will be illustrated specifically with regard to the process of searching for an ISBN. One of ordinary skill in the art will appreciate that the actions/steps outlined for flow diagram 700 may be directed towards searching for any article which corresponds to an item or items within the catalog content 112. This may extend further than searching for articles specifically directed towards a single item or item group. In some embodiments, articles on topics of a general nature may correspond to specific items within the catalog content 112. For example, articles which pertain to skiing may correspond to skiing equipment, skiing books, or skiing lessons contained within the catalog content 112.

Block 702 describes the step of identifying an ISBN of a book within an article. Integration rules 228 may specify a certain location within an article in which to search for an ISBN. In some embodiments, ISBNs may be identified by unique characteristics, such as the presence of a string of numbers of a certain length, or by identifying a potential ISBN along with information in the article related to the book which the ISBN describes, such as that book's author or title. Block 704 describes the step of retrieving an item within the catalog content 112 which corresponds to the indentified ISBN. Since the ISBN serves as an identifier for a book, the method can identify whether a book with a matching ISBN exists within the catalog content 112, and if it does, retrieve related information. The related information may include the author of the book, other titles in the same series, or any other information related to the book. In some embodiments, this information can be used in conjunction with article content as described above to validate the identified ISBN. Once the ISBN has been identified, the flow diagram proceeds at step 708, which records the correlation of the catalog item (as identified by the ISBN) and the article.

At block 708, the flow diagram proceeds to identify keywords within the article which are linked to recorded articles. This step begins by identifying a set of text within the article which is linked with other collaborative encyclopedia articles. After the set of text is identified, these other collaborative encyclopedia articles are examined to determine whether these other articles have been recorded as corresponding to catalog items. For example, an article directed towards Stephen King's "The Shining" may also contain the keyword "'Salem's Lot," which links to a collaborative encyclopedia article on a book of the same name. If the collaborative encyclopedia article "'Salem's Lot" has been recorded as corresponding to an item within the content catalog 112, then the keyword "'Salem's Lot" within the article "The Shining" will also be identified as corresponding to that catalog item.

Though the preceding example and FIG. 7 are depicted as applied to a single article, one of ordinary skill in the art will recognize that the same method may be applied to multiple articles concurrently. In addition, the method may be implemented such that some steps are not executed immediately after the completion of a previous step. For instance, some embodiments may implement blocks 702, 704, and 706 with respect to multiple articles before beginning the execution of blocks 708 or 710. In these embodiments, the method may identify some or all articles as corresponding to catalog items before proceeding to identify keywords in any single article. Additionally, though the preceding example discusses the identification of articles related to books, keywords within an article may correspond to any item within the catalog content 112. If, for instance, an article is identified as corresponding to a book, keywords within that article should not be implied to correspond only to books within the catalog content 112. On the contrary, an article corresponding to a book may contain keywords corresponding to music, movies, or any item contained within the catalog content 112.

While illustrative embodiments have been disclosed and discussed, one skilled in the relevant art will appreciate that additional or alternative embodiments may be implemented within the spirit and scope of the present invention. Additionally, although many embodiments have been indicated as illustrative, one skilled in the relevant art will appreciate that the illustrative embodiments do not need to be combined or implemented together. As such, some illustrative embodiments do not need to be utilized or implemented in accordance with scope of variations to the present disclosure.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

All of the methods and tasks described herein, and particularly those described as performed by the electronic catalog system or article integration system, may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other computer-readable storage medium or system. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks, including the supplemented articles, may be persistently stored by transforming physical storage devices, such as solid state memory chips and/or magnetic disks, into a different state.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A method of integrating collaborative encyclopedia content with electronic catalog content, the method comprising:
retrieving a user-generated article from a collaborative encyclopedia site independent of user requests for said article, wherein the collaborative encyclopedia site is separate from the electronic catalog site and enables users to collaboratively generate and modify articles regarding encyclopedic topics, said article collaboratively generated by users of the collaborative encyclopedia site, said article directed to a particular encyclopedia topic;
analyzing textual content of the article according to a set of rules to identify at least one reference in the article to a catalog item represented in an electronic catalog, said electronic catalog hosted by the electronic catalog site;
generating an electronic page which includes said article, wherein generating the electronic page includes supplementing the article with one or more links to information within the electronic catalog site corresponding to the at least one reference to the catalog item, wherein generating the electronic page further comprises:
identifying a link within the electric page referencing an additional article on the collaborative encyclopedia site;
determining that a storage of the electronic catalog, site contains a supplemented electronic page corresponding to the additional article; and
modifying the link to replace the reference to the additional article on the collaborative encyclopedia with a reference to the corresponding supplemented electronic page within the electronic catalog site; and
storing the electronic page at the electronic catalog site for subsequent transmission from the electronic catalog site to a user computing device;
said method performed in its entirety by a computer system that comprises one or more computers distinct from the user computing device.

2. The method of claim 1, further comprising selecting the set of rules based at least partly on the collaborative encyclopedia's classification of said article.

3. The method of claim 1, wherein the retrieved article is an article corresponding to a media program.

4. The method of claim 1, wherein the retrieved article is an article corresponding to an author.

5. The method of claim 1, wherein supplementing the article with one or more links includes supplementing the article with code to display information pertaining to content of the electronic catalog associated with the least one reference to the catalog item concurrently with the article.

6. The method of claim 1, wherein supplementing the article with one or more links includes supplementing the article with code operable to provide a user the option select one or more catalog items associated with the one or more links for purchase.

7. The method of claim 1, wherein at least one of the one or more links is responsive to user selection of the link by causing a visual display of the page to be supplemented with a popover that displays information pertaining to content of the electronic catalog associated with the least one reference to a catalog item.

8. The method of claim 7, wherein the popover provides additional functionality to select the catalog item for purchase.

9. Computer storage comprising one or more non-transitory storage devices, said computer storage having stored thereon computer-executable instructions that direct a computer system associated with an electronic catalog site to perform a method that comprises:
retrieving at the computer system, a user-generated article from a secondary content system independent of user requests for said article, wherein said article is collaboratively generated by users of the secondary content system, and wherein the secondary content system is an electronic encyclopedia distinct from the electronic catalog site;
analyzing textual content of the article according to a set of rules to identify at least one reference in the article to a catalog item represented in an electronic catalog, said electronic catalog hosted by the electronic catalog site; and
generating an electronic page which includes said article, wherein generating the electronic page includes supplementing the article with one or more links to information corresponding to the at least one reference to the catalog item within the electronic catalog site, wherein generating the electronic page further comprises;
    identifying a link within the electric page referencing an additional article on the secondary content system;
    determining that the electronic catalog site contains a supplemented electronic page corresponding to the additional article; and
    modifying the link to replace the reference to the additional article on the secondary content system with a reference to the corresponding supplemented electronic page within the electronic catalog site; and
storing information representative of the electronic page in the computer system for subsequent transmission of the electronic page from the electronic catalog site to a user computing device;
said method performed in its entirety by a computer system that comprises one or more computers distinct from the user computing device.

10. The computer storage of claim 9, wherein the method further comprises outputting the electronic page for presentation to a user.

11. The computer storage of claim 9, wherein the method further comprises, in response to receiving a query corresponding to the catalog item, outputting a set of query results, the set of results comprising a link to information regarding the catalog item and a link to the electronic page.

12. The computer storage of claim 9, wherein the method further comprises selecting the set of rules based at least partly on the collaborative encyclopedia's classification of said article.

13. The computer storage of claim 9, wherein the retrieved article is an article corresponding to a media program.

14. The computer storage of claim 9, wherein the retrieved article is an article corresponding to an author.

15. The computer storage of claim 9, wherein the popover provides additional functionality to select the catalog item for purchase.

16. The computer storage of claim 9, wherein the electronic page includes coding operable to, on request of the electronic page by a user, receive a set of preferences and modify the popover according to the preferences.

17. The computer storage of claim 9, wherein supplementing the electronic page with one or more links includes supplementing the electronic page with code to display information pertaining to content of the electronic catalog associated with the least one reference to the catalog item concurrently with the article.

18. The computer storage of claim 9, wherein supplementing the electronic page with one or more links includes supplementing the electronic page with code operable to provide a user the option select the catalog item associated with the one or more links for purchase.

19. The computer storage of claim 9, wherein at least one of the one or more links is responsive to user selection of the link by causing a visual display of the page to be supplemented with a popover that displays information pertaining to content of the electronic catalog associated with the least one reference to the catalog item.

20. The computer storage of claim 19, wherein the popover provides additional functionality to select the catalog item for purchase.

21. The computer storage of claim 9, wherein the method further comprises, prior to retrieving the article, automatically selecting the article for retrieval based at least in part on a determined volatility of the article, wherein the determined volatility of the article represents a number of changes to the article over a period of time.

22. A system for integrating secondary content with an electronic catalog of items, the system comprising:
    a content integration system comprising one or more computers associated with an electronic catalog site, said content integration system operable to:
        receive from a secondary content system distinct from the electronic catalog site one or more electronic pages independent of user requests for said one or more electronic pages; and
        for each of the one or more electronic pages:
            determine a plurality of keywords within the electronic page, each of the plurality of keywords being associated with an item or group of items represented in an electronic catalog of the electronic catalog site; and
            supplement the electronic page with one or more links, each link being associated with at least one of the plurality of keywords and being selectable to view associated content of the electronic catalog site;
    a storage cache operable to store information representative of the supplemented electronic pages at the electronic catalog site for future transmission of the supplemented electronic pages from the electronic catalog site to a user computing device distinct from the content integration system;
    a network-based user access system operable to provide the user computing device access to the supplemented articles stored in the cache; and
    wherein the content integration system is further operable to, for each of one or more electronic pages:
        identify a link within the electric name referencing an additional electronic page on the secondary content system;
        determine that the storage cache contains a supplemented electronic page corresponding to the additional electronic page; and
        modify the link to replace the reference to the additional article on the secondary content system with a reference to the corresponding supplemented electronic page within the storage cache.

23. The system as recited in claim 22, the network-based user access system further operable to, in response to receiving a query corresponding to an item within the electronic catalog, output a set of results, the set of results comprising a link to information regarding the item and a link to a supplemented electronic page stored within the storage cache, the supplemented electronic page corresponding to the item within the electronic catalog corresponding to the query.

24. The system as recited in claim 22, wherein determining a plurality of keywords within the electronic page includes determining a plurality of keywords according to a set of rules.

25. The system as recited in claim 24, wherein the set of rules is determined based at least partly on the secondary content system's classification of the electronic page.

26. The system as recited in claim 24, wherein at least some of the retrieved one or more electronic pages are electronic pages corresponding to media programs.

27. The system as recited in claim 24, wherein at least some of the retrieved one or more electronic pages are electronic pages corresponding to authors.

28. The system as recited in claim 22, wherein supplementing the electronic page with one or more links includes supplementing the electronic page with code to display information pertaining to content of the electronic catalog associated with at least one of the plurality of keywords concurrently with the electronic page.

29. The system are recited in claim 22, wherein the content integration system is further operable to supplement the electronic page with code operable to provide a user the option to select one or more items associated with the one or more links for purchase.

30. The system as recited in claim 22, wherein at least one of the one or more links is responsive to user selection of the link by causing a visual display of the page to be supplemented with a popover that displays information pertaining to content of the electronic catalog associated with at least one of the plurality of keywords.

31. The system as recited in claim 30, wherein the popover includes purchasing options for the content of the electronic catalog associated with the at least one of the plurality of keywords.

32. The system of claim 22 further comprising a catalog search system configured to:
　receive a query for at least one item represented in the electronic catalog, wherein the query comprises search terms associated with at least one supplemented electronic page; and
　in response to said query, transmit search results comprising information regarding the at least one item and a link to the at least one supplemented electronic page.

\* \* \* \* \*